(12) United States Patent  
Kim

(10) Patent No.: US 9,037,090 B2  
(45) Date of Patent: May 19, 2015

(54) SIGNAL ENHANCEMENT

(75) Inventor: Seungil Kim, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 163 days.

(21) Appl. No.: 13/700,078

(22) PCT Filed: Feb. 7, 2012

(86) PCT No.: PCT/US2012/024175
§ 371 (c)(1),
(2), (4) Date: Nov. 26, 2012

(87) PCT Pub. No.: WO2013/119213
PCT Pub. Date: Aug. 15, 2013

(65) Prior Publication Data
US 2013/0203356 A1    Aug. 8, 2013

(51) Int. Cl.
*H04B 1/00* (2006.01)
*H04B 15/00* (2006.01)
*G06F 3/041* (2006.01)
*H04W 4/00* (2009.01)

(52) U.S. Cl.
CPC .............. *H04B 15/00* (2013.01); *G06F 3/0416* (2013.01); *H04W 4/008* (2013.01)

(58) Field of Classification Search
CPC ....................................................... H04B 15/00

USPC ........................ 455/63.1, 456.1, 457; 345/173
See application file for complete search history.

(56) References Cited

U.S. PATENT DOCUMENTS

| 2002/0050983 | A1* | 5/2002 | Liu et al. ........................ 345/173 |
| 2005/0113953 | A1* | 5/2005 | Smaragdis ..................... 700/100 |
| 2008/0246736 | A1* | 10/2008 | Han ............................... 345/173 |
| 2009/0137204 | A1 | 5/2009 | Chang |
| 2010/0167664 | A1* | 7/2010 | Szini ............................... 455/73 |
| 2010/0289752 | A1* | 11/2010 | Birkler .......................... 345/173 |
| 2011/0058676 | A1 | 3/2011 | Visser |

FOREIGN PATENT DOCUMENTS

WO    2008121905 A2    9/2008

OTHER PUBLICATIONS

Kurita, S., et al, Evaluation of blind signal separation method using directivity pattern under reverberant conditions, ICASSP 2000, Proceedings of the Acoustics, Speech, and Signal Processing, pp. 3140-3143, Jun. 2000, IEEE Computer Society, Washington DC, USA.
United States Patent and Trademark Office, International Search Report and Written Opinion of the International Searching Authority for PCT/US2012/024175, mailed on May 18, 2012.

* cited by examiner

*Primary Examiner* — Tuan H Nguyen
(74) *Attorney, Agent, or Firm* — Alpine Technology Law Group LLC

(57) ABSTRACT

Technologies and implementations for signal enhancement are generally disclosed.

21 Claims, 6 Drawing Sheets

500 A computer program product.

502 A signal bearing medium.

504 Machine-readable non-transitory medium having stored therein instructions that, when executed by one or more processors, operatively enable a computing device to:
    receive an indication of a device on a surface of a touch screen;
    determine a location of the device on the surface of a touch screen;
    detect a signal from the device; and
    enhance the signal based, at least in part, on the determined location of the device and the detected signal from the device.

| 506 a computer-readable medium. | 508 a recordable medium. | 510 a communications medium. |

FIG. 5

SIGNAL ENHANCEMENT

CROSS-REFERENCE TO RELATED APPLICATIONS

The present application is a U.S national stage filing under 35 U.S.C. §371 of International Application No. PCT/US12/24175, filed on Feb. 7, 2012.

BACKGROUND

Unless otherwise indicated herein, the approaches described in this section are not prior art to the claims in this application and are not admitted to be prior art by inclusion in this section.

Handheld devices such as, but not limited to, tablet computers, mobile phones, handheld gaming devices, etc. have increased data capacity. In order to facilitate sharing or accessing data on the handheld devices, methods of communication with handheld devices have become more important. Some examples may include near field communication, Bluetooth, Wi-Fi, and various other methods to facilitate wireless communication between electronic devices.

SUMMARY

The present disclosure describes example methods, apparatus, and systems related to signal enhancement between electronic devices. Such an apparatus may include a touch screen, a number of wireless signal detectors located approximately around a perimeter of the touch screen, a machine readable non-transitory medium, and a processor. The processor may be communicatively coupled to the touch screen, the machine readable non-transitory medium, and the number of wireless signal detectors. The machine readable non-transitory medium may have stored therein instructions that, if executed by the processor, may operatively enable a computing device to receive an indication of a device on a surface of a touch screen. The computing device may determine a location of the device on the surface of the touch screen, and from the device, a signal may be detected. The signal may be enhanced based, at least in part, on the determined location and the detected signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 illustrates an example computer program product that is arranged in accordance with at least some examples of the present disclosure.

DETAILED DESCRIPTION

Figure 1:
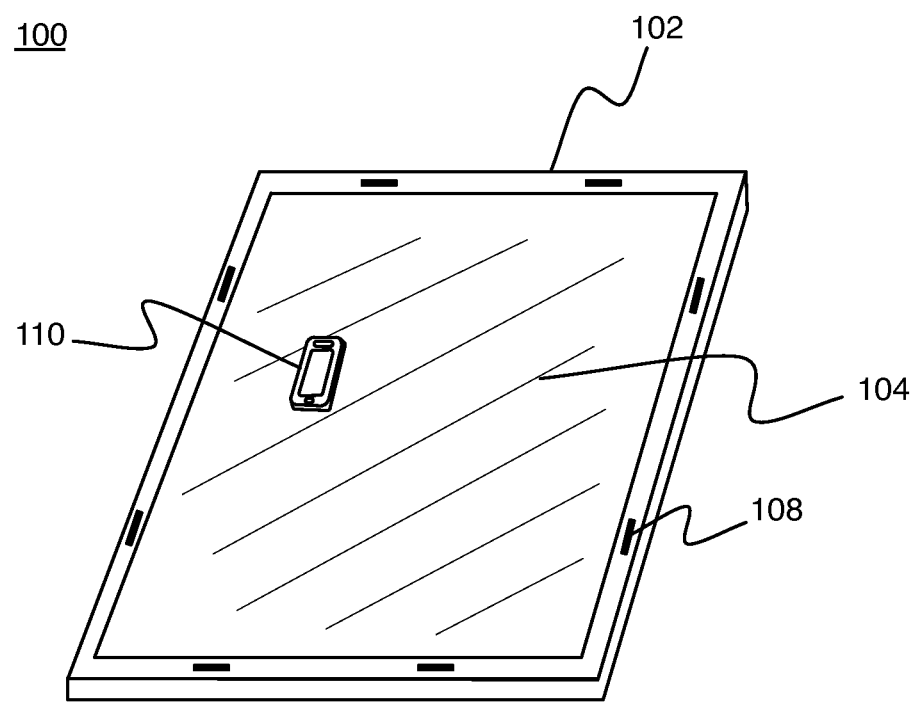
FIG. 1 illustrates an example apparatus that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related signal enhancement.

As discussed above, examples of signal enhancement technology described herein may include utilizing a touch screen and locating a device on the touch screen. Signal from the device may be enhanced base, at least in part, on the location of the device on the touch screen.

FIG. 1 illustrates an example apparatus 100 that is arranged in accordance with at least some embodiments of the present disclosure. In the illustrated example, the apparatus 100 may include a touch screen 102 having a surface 104. The touch screen 102 may also include a number of wireless signal detectors 108 located approximately around the perimeter of the touch screen 102. Additionally, a device 110 is shown placed on the surface 104 of the touch screen 102.

In the illustrated example of FIG. 1, a computing device communicatively coupled with the touch screen 102, may receive an indication that the device 110 is on the surface 104. A location of the device 110 on the surface 104 may then be determined. Additionally, a signal may be detected from the device 110 by one or more wireless signal detectors 108. The signal may then be enhanced, where the enhancement may be based, at least in part, on the location of the device 110 on the surface 104 of the touch screen 102 and the detected signal, in accordance with various embodiments of the disclosure.

Additionally in some embodiments, detecting the signal may facilitate determining a direction of the signal from the device 110.

In FIG. 1, the touch screen 102 may be a wide variety of touch screens employing various technologies such as, but not limited to, resistive type touch screens or capacitive type touch screens. The surface 104 may be a wide variety of surfaces such as, but not limited to, transparent flexible surface, a rigid glass-type surface, and so forth, and accordingly, the claimed subject matter is not limited in these respects.

The device 110 may include a wide variety of devices capable of emitting some form of wireless signal such as, but not limited to, mobile phones, smart type mobile phones, personal digital assistants, tablet computers, and so forth.

In the embodiment illustrated in FIG. 1, the wireless signal detectors 108 are shown located approximately around the perimeter of the touch screen 102. The wireless signal detectors 108 may be a wide variety of detectors suitable for detecting wireless signals such as, but not limited to, detectors utilizing antenna and radios to facilitate scanning capabilities. Accordingly, the location of the detectors 108 may be any location on, in, and/or near the touch screen 102 and in a wide variety of patterns. Additionally, even though the number of detectors shown may be eight, it is contemplated within the scope of the claimed subject matter that the number of detectors may be any number.

As will be described in more detail, in FIG. 1, signals from the device 110 may be enhanced in accordance with various embodiments of the present disclosure.

Figure 2:
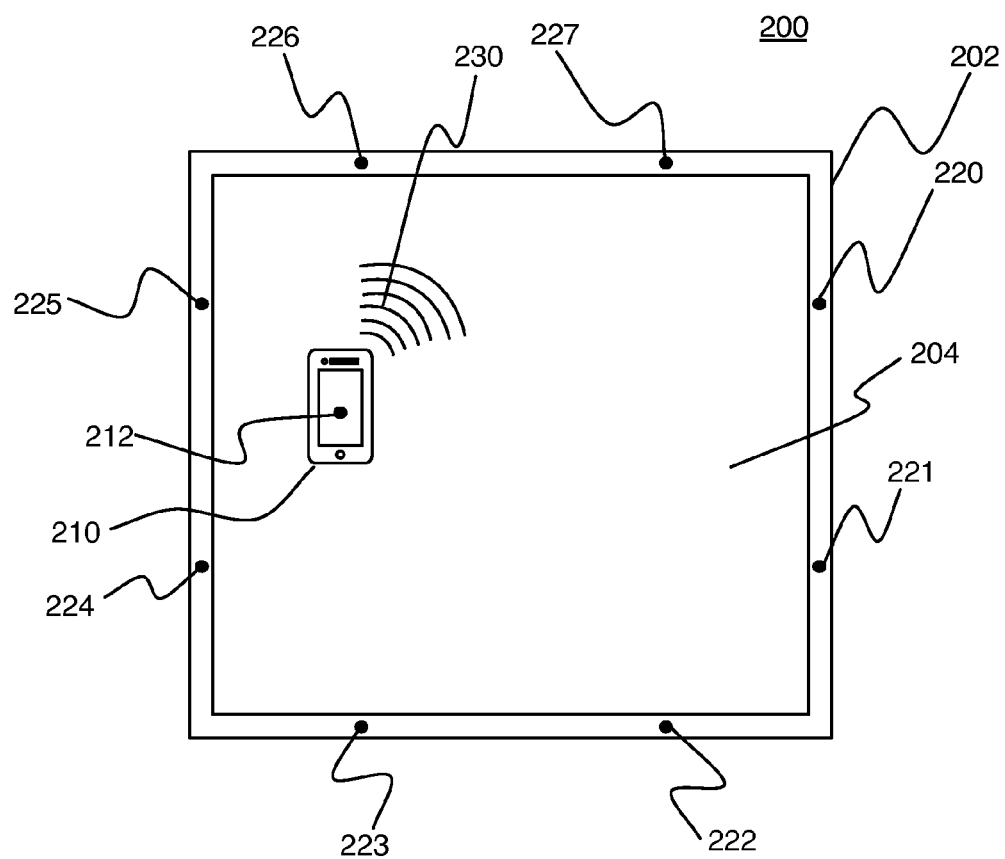
FIG. 2 illustrates a plan view of another example apparatus that is arranged in accordance with various embodiments of the present disclosure.

FIG. 2 illustrates a plan view of another example apparatus 200 that is arranged in accordance with various embodiments of the present disclosure. As shown in FIG. 2, the apparatus 200 may include a touch screen 202 having a generally rectangular shape. The touch screen 202 may have a surface 204, and on the surface 204, there may be placed a device 210. As illustrated, the device 210 may have a center point 212. Additionally, a number of wireless signal detectors 220-227 (numbered clockwise and approximately equally spaced) may be located approximately around a perimeter of the touch screen 202. In FIG. 2, a representation of a wireless signal 230 being emitted by the device 210 may be shown.

In FIG. 2, the touch screen 202 may receive an indication that the device 210 is on the surface 204. The indication of the device 210 on the surface 204 may include an indication of distortion on the surface 204, and from the indication of distortion on the surface 204, an approximate size of the device 210 may be determined. Accordingly, in one embodiment, the location of the device 210 may be determined by determining a center point 212 of the device 210.

As illustrated in FIG. 2, the center point 212 of the device 210 may be located approximately towards a left side of the touch screen 202 closer to the wireless signal detectors 224, 225, and 226. Accordingly, the wireless signal detectors 224, 225, and 226 may be capable of detecting the signal 230 from the device 210. As will be described in detail further below, the signal 230 may be enhanced based, at least in part, on the location of the device 210 (e.g., the center point 212) and the detected signal from the device 210 in accordance with various embodiments. Additionally, because it may be difficult to determine the position of the antenna included in the device 210 for facilitating the emission of the signal 230, the utilization of the number of wireless signal detectors 224, 225, and 226 along with the center point 212 may facilitate signal enhancement by reducing effects of position estimation errors.

With continued reference to FIG. 2, the touch screen 202 may be shown as having a substantially rectangular shape, but it should be appreciated that the touch screen 202 may be a wide variety of touch screens having a variety of polygonal shapes or may be of a random shape. As previously described with reference to the surface 104, the surface 204 may be of a wide variety of surfaces. As alluded to previously, the surface 204 may include one or more sensors capable of detecting an object on the surface 204. The detection may include detecting a distortion on the surface 204 of the touch screen 202. One or more such sensors may include sensors such as, but not limited to, a piezoelectric type sensor capable of detecting minute distortions (e.g., pressure) on a surface, an optical type sensors capable of detecting objects obscuring light (i.e., capable of determining an approximate size of an object by a shadow cast by the object on a surface), a sensor capable of detecting a change in a magnetic field of a surface, an optical image capturing sensor (e.g., image capturing sensor capable of object recognition), etc., and accordingly, the claimed subject matter is not limited in these respects. As may be appreciated, such sensors may be utilized to facilitate determination of the center point 212 of the device 210.

The device 210 may be a wide variety of devices capable of emitting some form of wireless signal as previously described, and accordingly, the signal 230 may be a wide variety of wireless signals. The signal 230 may be a wireless signal such as, but not limited to, radio frequency identification (RFID) type signal, near field communication type signal, Infrared Data Association (IrDA) type signal, Bluetooth type signal, or a wide variety of personal area network (PAN) capable signals, and accordingly, is not limited in these respects.

Figure 3:
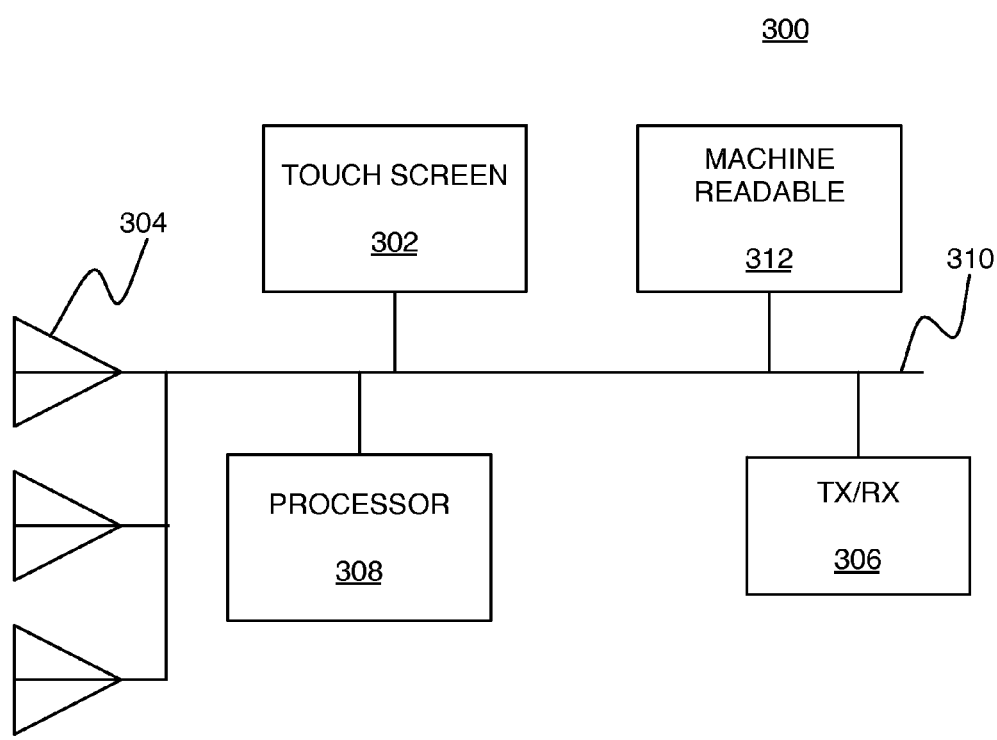
FIG. 3 illustrates a block diagram of another example apparatus that is arranged in accordance with at least some embodiments of the present disclosure.

FIG. 3 illustrates a block diagram of another example apparatus 300 that is arranged in accordance with at least some embodiments of the present disclosure. In the illustrated example, the apparatus 300 may include a touch screen 302, a number of wireless signal detectors 304, a transmit and receive (TX/RX) module 306, a processor 308, and a machine readable non-transitory medium 312. The processor 308 may be communicatively coupled to the touch screen 302, the number of wireless signal detectors 304, the TX/RX module 306, and the machine readable non-transitory medium 312 via a communication medium 310.

In FIG. 3, as will be described in more detail, the machine readable non-transitory medium 312 may have instructions that, when executed by processor 308, operatively enable the apparatus 300 to receive an indication of a device (e.g., the device 110 in FIG. 1 or the device 210 in FIG. 2) on a surface (e.g., the surface 104 in FIG. 1 or the surface 204 in FIG. 2) of the touch screen 302. The apparatus 300 may then determine a location of the device on the surface of the touch screen 302. Additionally, the apparatus 300 may detect a signal (e.g., the signal 230 in FIG. 2) via the TX/RX module 306 and determine a direction of the signal from the device. As will be describe in more detail, based, at least in part, on the determined location of the device and the detected signal from the device, the apparatus 300 may enhance the signal.

In FIG. 3, the apparatus 300 may be configured to facilitate utilization of a wide variety of signal management techniques such as, but not limited to, multi-channel enhancement techniques, in accordance with various embodiments. In one embodiment, the wireless signal detectors 304 may be configured for beamforming. For example, briefly referring back to FIG. 2, the wireless signal detectors 224, 225, and 226 may be utilized as an array of detectors for detection of the signal 230, and accordingly, the apparatus 300 may transmit wireless signals via the TX/RX module 306 by managing a directionality of the wireless signal detectors 224, 225, and 226 utilizing beamforming techniques. In one embodiment, the apparatus 300 may be configured to utilize independent component analysis techniques based, at least in part, on a location of a device and a detected signal from the device as previously described. These signal management techniques are but a few examples, and accordingly, the claimed subject matter is not limited in these respects.

In the embodiment illustrated in FIG. 3, the apparatus 300 may be included in a wide variety of computing devices such as, but not limited to, a mobile device, a client device, a server type device, ubiquitous type computing environment (e.g., cloud type computing), and so forth, and accordingly, the claimed subject matter is not limited in these respects. For the purposes of describing the disclosed subject matter, the apparatus 300 may be included in a device having a touch screen such as, but not limited to, a table like device. It follows that the communication medium 310 may be a wide variety of communication mediums to facilitate communicative coupling of various components/modules such as, but not limited to, a bus type medium (i.e., physical) or WiFi type medium (i.e., wireless).

The processor 308 may represent one or more processors, which may include a wide variety of processors such as, but not limited to a computer, a microprocessor, a microcontroller, a field programmable gate array (FPGA), an application specific integrated circuit (ASIC), a sequestered thread or a core of a multi-core/multi-threaded microprocessor or a combination thereof.

It should be appreciated by those skilled in the art, that in order to not obscure the disclosed subject matter and to facilitate understanding of the disclosed subject matter, the apparatus 300 (shown in FIG. 3) and their respective components are illustrated as functional blocks. That is, it is contemplated that the apparatus 300 may be implemented in a wide variety of manners within the scope of the claimed subject matter without detracting the disclosed subject matter, and accordingly, the disclosed subject matter is not limited in these respects.

Figure 4:
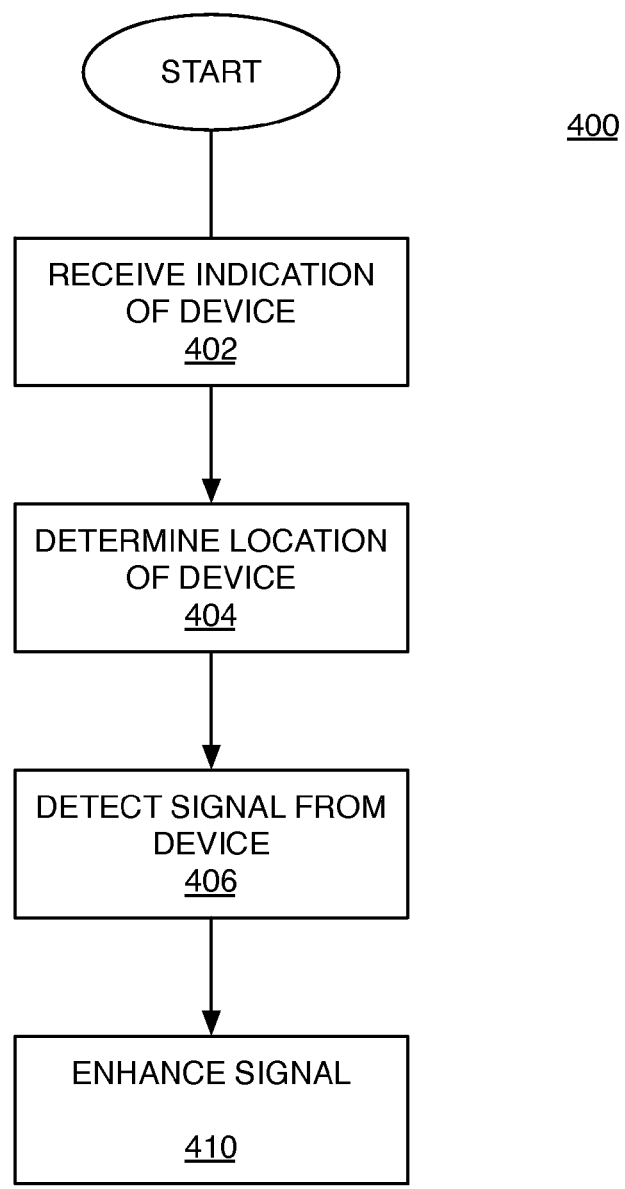
FIG. 4 illustrates an example process for enhancing a signal in accordance with at least some embodiments of the present disclosure.

FIG. 4 illustrates another example of a process 400 for signal enhancement in accordance with at least some embodiments of the present disclosure. In the illustrated example, the process 400 may include one or more of functional operations as indicated by example operations 402, 404, 406, 408, and/or 410.

As illustrated, the process 400 may be implemented for signal enhancement. Processing may begin at an operation 402, "RECEIVE INDICATION OF DEVICE", where an indication of a device on a surface of a touch screen may be received.

The processing may continue from the operation 402 to an operation 404, "DETERMINE LOCATION OF DEVICE", where a location of the device on the surface of the touch screen may be determined.

The processing may continue from the operation 404 to an operation 406, "DETECT SIGNAL FROM DEVICE", where a signal from the device may be detected.

The processing may continue from the operation 406 to an operation 410, "ENHANCE SIGNAL", where based, at least in part, on the determined location of the device and the detected signal from the device, the signal may be enhanced.

As previously described, in some embodiments, a direction of the signal from the device may be determined.

It should be appreciated that the above described process 400 may be implemented in a wide variety of manners such as, but not limited to, the various embodiments of the present disclosure and variations thereof.

FIG. 5 illustrates an example of a computer program product 500 that is arranged in accordance with at least some examples of the present disclosure. The program product 500 may include a signal bearing medium 502. The signal bearing medium 502 may include a machine readable non-transitory medium having stored therein instructions 504 that, if executed by one or more processors, may operatively enable a computing device to provide the functionality described above with respect to FIG. 4. Thus, for example, the apparatus 300 (see, e.g., FIG. 3) may undertake one or more of the actions shown in FIG. 4 in response to the execution of the instructions 504 conveyed by the signal bearing medium 502.

In some implementations, the signal bearing medium 502 may encompass a non-transitory computer-readable medium 506, such as, but not limited to, a hard disk drive, a Compact Disc (CD), a Digital Versatile Disk (DVD), a digital tape, memory, etc. In some implementations, the signal bearing medium 502 may encompass a recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.).

Figure 6:
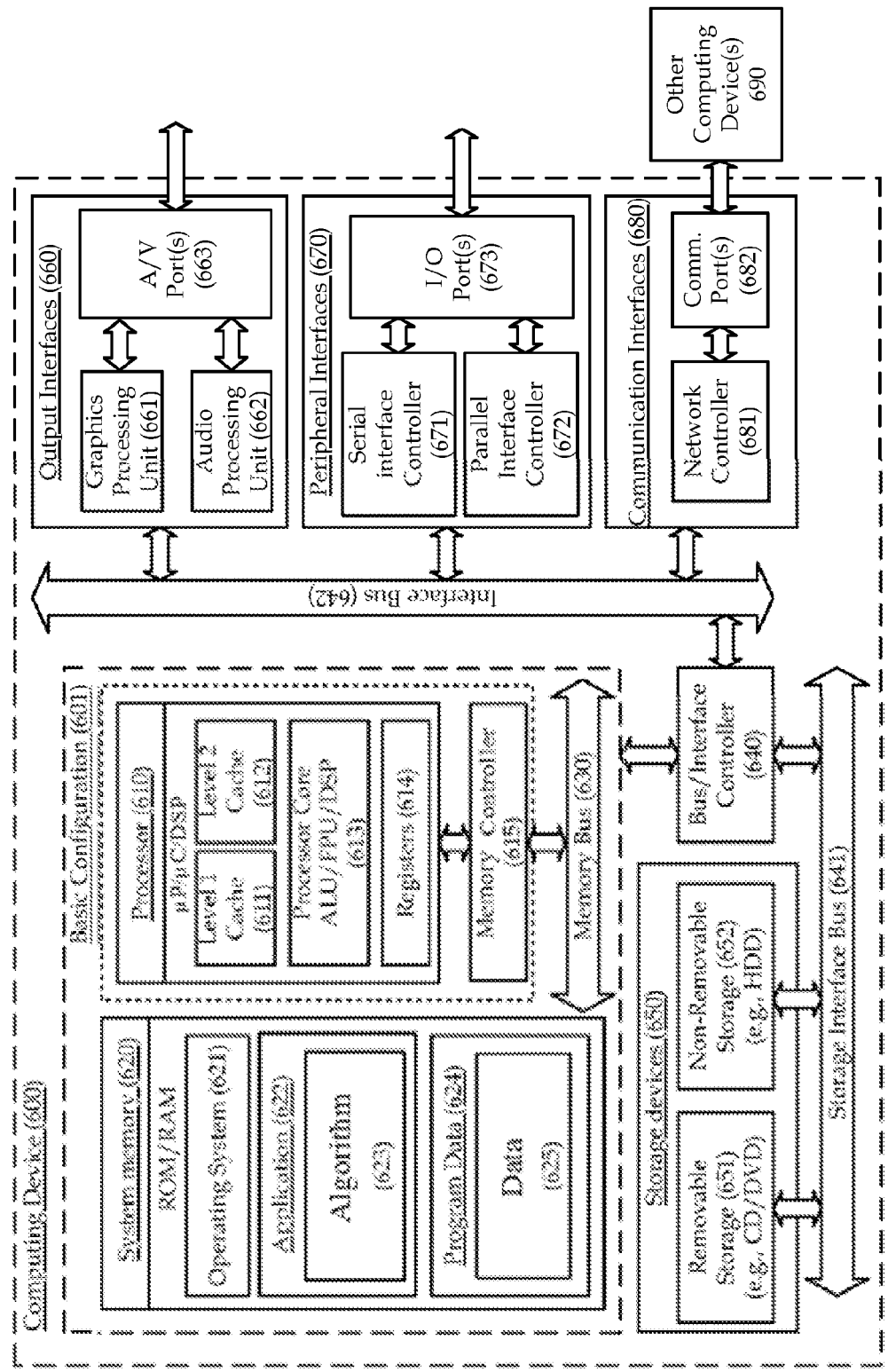
FIG. 6 is a block diagram illustrating an example computing device, such as might be embodied by a person skilled in the art, which is arranged in accordance with at least some embodiments of the present disclosure.

FIG. 6 is a block diagram illustrating an example computing device 600, such as might be embodied by a person skilled in the art, which is arranged in accordance with at least some embodiments of the present disclosure. In one example of a basic configuration 601, the computing device 600 may include one or more processors 610 and a system memory 620. A memory bus 630 may be used for communicating between the one or more processor 610 and the system memory 620.

Depending on the desired configuration, the one or more processor 610 may be of any type including but not limited to a microprocessor (µP), a microcontroller (µC), a digital signal processor (DSP), or any combination thereof. The one or more processor 610 may include one or more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the one or more processor 610, or in some implementations the memory controller 615 may be an internal part of the one or more processor 610.

Depending on the desired configuration, the system memory 620 may be of any type including but not limited to volatile memory (such as RAM), non-volatile memory (such as ROM, flash memory, etc.) or any combination thereof. The system memory 620 may include an operating system 621, one or more applications 622, and program data 624. The one or more applications 622 may include a signal enhancement algorithm 623 that is arranged to perform the functions as described herein including the functional blocks and/or actions described with respect to the process 400 of FIG. 4. The program data 624 may include signal enhancement data 625 for use with the signal enhancement algorithm 623. In some example embodiments, the one or more applications 622 may be arranged to operate with program data 624 on the operating system 621 such that implementations of signal enhancement may be provided as described herein. For example, the apparatus 100 (see, e.g., FIG. 1) and/or the apparatus 300 (see, e.g., FIG. 3) may comprise all or a portion of the computing device 600 and may be capable of performing all or a portion of the one or more applications 622 such that implementations of signal enhancement may be provided as described herein. This described basic configuration 601 is illustrated in FIG. 6 by those components within dashed line.

The computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The one or more data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 620, the removable storage devices 651 and the non-removable storage devices 652 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be a part of the computing device 600.

The computing device 600 may also include an interface bus 642 for facilitating communication from various interface devices (e.g., output interfaces, peripheral interfaces, and communication interfaces) with the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 690 over a network communication via one or more communication ports 682. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that may include any of the above functions. The computing device 600 may also be implemented as a personal computer including both laptop computer and non-laptop computer configurations. In addition, the computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to enhance a signal with a device on a touch screen comprising:
   receiving via the touch screen an indication of the device on a surface of the touch screen;
   determining a location of the device on the surface of the touch screen based at least in part on the indication;
   detecting a signal and a direction of the signal from the device using beamforming with two or more sensors disposed proximate to the touch screen; and
   enhancing the beamforming detected signal based, at least in part, on the determined location of the device and the detected signal from the device.

2. The method of claim 1, wherein receiving the indication of the device comprises receiving an indication of distortion on the surface of the touch screen.

3. The method of claim 2 further comprising:
   determining an approximate size of the device based, at least in part, on the received indication of distortion on the surface of the touch screen.

4. The method of claim 1, wherein determining the location of the device comprises determining a center point of the device on the surface of the touch screen.

5. The method of claim 1, wherein detecting the signal from the device comprises detecting a signal-to-noise ratio signal.

6. The method of claim 1, wherein enhancing the signal comprises enhancing the signal utilizing independent component analysis.

7. The method of claim 1, wherein enhancing the signal comprises enhancing the signal based, at least in part, on a generalized cross correlation with phase transformation.

8. A machine readable non-transitory medium having stored therein instructions that, when executed by one or more processors, operatively enable a computing device to:
   receive via the touch screen an indication of a device on a surface of a touch screen;
   determine a location of the device on the surface of the touch screen based at least in part on the indication;
   detect a signal and a direction of the signal from the device using beamforming with two or more sensors disposed proximate to the touch screen; and
   enhance the beamforming detected signal based, at least in part, on the determined location of the device and the detected signal from the device.

9. The machine-readable non-transitory medium of claim 8, wherein the stored instructions that, when executed by one or more processors, further operatively enable the computing device to receive an indication of distortion on the surface of the touch screen.

10. The machine-readable non-transitory medium of claim 9, wherein the stored instructions that, when executed by one or more processors, further operatively enable the computing device to determine a proximate size of the device, based at least in part, on the received indication of distortion on the surface of the touch screen.

11. The machine-readable non-transitory medium of claim 8, wherein the stored instructions that, when executed by one or more processors, further operatively enable the computing device to determine a center point of the location of the device on the surface of the touch screen.

12. The machine-readable non-transitory medium of claim 8, wherein the stored instructions that, when executed by one or more processors, further operatively enable the computing device to detect a signal-to-noise ratio signal.

13. The machine-readable non-transitory medium of claim 8, wherein the stored instructions that, when executed by one or more processors, further operatively enable the computing device to enhance the signal utilizing independent component analysis.

14. The machine-readable non-transitory medium of claim 8, wherein the stored instructions that, when executed by one or more processors, further operatively enable the computing device to enhance the signal based, at least in part, on generalized cross correlation with phase transformation.

15. A system comprising:
    a touch screen having a surface;
    a plurality of wireless signal detectors located approximately around a perimeter of the touch screen; and
    a processor communicatively coupled to the touch screen and the plurality of wireless signal detectors, the processor being configured to receive via the touch screen an indication of a device on the surface of the touch screen, detect a signal from the device using beamforming, via the wireless signal detectors, determine the direction of the signal from the device based at least in part on the indication, via the wireless signal detectors, to determine a location of the device on the touch screen, and enhance the beamforming detected signal based, at least in part, on the determined location of the device and the detected signal from the device.

16. The system of claim 15, wherein the processor is further configured to receive an indication of distortion on the surface of the touch screen.

17. The system of claim 16, wherein the processor is further configured to determine an approximate size of the device based, at least in part, on the received indication of distortion on the surface of the touch screen.

18. The system of claim 15, wherein the processor is further configured to determine a center point of the device on the surface of the touch screen.

19. The system of claim 15, wherein the processor is further configured to detect a signal-to-noise ratio signal.

20. The system of claim 15, wherein the processor is further configured to enhance the signal utilizing independent component analysis.

21. The system of claim 15, wherein the processor is further configured to enhance the signal based, at least in part, on a generalized cross correlation with phase transformation.

* * * * *